(12) United States Patent
Strobel

(10) Patent No.: US 12,476,714 B2
(45) Date of Patent: Nov. 18, 2025

(54) ELECTRICAL DUOBINARY SOFT INFORMATION RECEIVER FOR NRZ MODULATION FIBER TRANSMISSION

(71) Applicant: MAXLINEAR, INC., Carlsbad, CA (US)

(72) Inventor: Rainer Strobel, Munich (DE)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 18/440,933

(22) Filed: Feb. 13, 2024

(65) Prior Publication Data

US 2024/0187108 A1 Jun. 6, 2024

Related U.S. Application Data

(62) Division of application No. 17/594,357, filed as application No. PCT/US2020/027367 on Apr. 9, 2020, now Pat. No. 11,901,954.

(60) Provisional application No. 62/833,108, filed on Apr. 12, 2019.

(51) Int. Cl.
*H04B 10/69* (2013.01)
*H04B 10/516* (2013.01)
*H04B 10/40* (2013.01)

(52) U.S. Cl.
CPC ......... *H04B 10/69* (2013.01); *H04B 10/5167* (2013.01); *H04B 10/40* (2013.01)

(58) Field of Classification Search
None
See application file for complete search history.

(56) References Cited

U.S. PATENT DOCUMENTS

| | | |
|---|---|---|
| 5,003,308 A | 3/1991 | Furniss et al. |
| 5,654,991 A | 8/1997 | Andren et al. |
| 7,190,741 B1 | 3/2007 | Manning |

(Continued)

FOREIGN PATENT DOCUMENTS

WO 2020210423 A2 10/2020

OTHER PUBLICATIONS

Baldi M., et al., "Finite-Precision Analysis of Demappers and Decoders for LDPC-Coded M-QAM Systems," In IEEE Transactions on Broadcasting, IEEE Service Center, Piscataway, NJ, US, Jun. 2009, vol. 55, No. 2, pp. 239-250, DOI: 10.1109/TBC.2009.2016498, ISSN 0018-9316, XP011256506, [Published on Apr. 28, 2009].

(Continued)

*Primary Examiner* — Darren E Wolf
(74) *Attorney, Agent, or Firm* — Buchalter; Jason W. Croft

(57) ABSTRACT

A receiver circuit is disclosed and is configured to receive an optical signal. The receiver circuit includes a receiving circuit configured to receive the optical signal and convert the optical signal from a duobinary signal format into a binary signal based on a plurality of decision thresholds. The receiver circuit also includes a clock data recovery circuit configured to sample the binary signal per data period at a first time instant based on a predetermined clock data recovery technique, and sample the binary signal per data period at a second time instant offset from the first instant, as well as determine an intermediate sample based on an offset for decoding a transmitted bit sequence according to soft information based on the samples.

11 Claims, 11 Drawing Sheets

(56) References Cited

U.S. PATENT DOCUMENTS

| | | | |
|---|---|---|---|
| 7,587,145 | B2 | 9/2009 | Shang et al. |
| 9,762,379 | B2 | 9/2017 | Kaneda |
| 11,901,954 | B2 | 2/2024 | Strobel |
| 2001/0033583 | A1 | 10/2001 | Rabenko et al. |
| 2001/0053678 | A1 | 12/2001 | Bonaccorso et al. |
| 2005/0024253 | A1 | 2/2005 | Adamiecki et al. |
| 2006/0176934 | A1 | 8/2006 | Riedel et al. |
| 2006/0193418 | A1 | 8/2006 | Fraasch et al. |
| 2008/0226301 | A1 | 9/2008 | Alic et al. |
| 2009/0238568 | A1 | 9/2009 | Lyubomirsky |
| 2009/0269081 | A1 | 10/2009 | Cai et al. |
| 2013/0336659 | A1 | 12/2013 | Dutta et al. |
| 2018/0019862 | A1* | 1/2018 | Kliewer ............ H04L 1/0047 |

OTHER PUBLICATIONS

Bosco G., et al., "Optimization of Branch Metric Exponent and Quantization Range in MLSE Receivers for Duobinary Systems," In IEEE Photonics Technology Letters, IEEE Service Center, Piscataway, NJ, US, Jun. 1, 2008, vol. 20, No. 11, pp. 924-926, DOI: 10.1109/LPT.2008.922369, ISSN 1041-1135, XP011214465.

International Search Report and Written Opinion for International Application No. PCT/US2020/027367, mailed Nov. 19, 2020, 20 Pages.

Moller L., et al., "10 Gb/s Duobinary Receiver with a Record Sensitivity of 88 Photons per Bit," In Optical Fiber Communication Conference, Technical Digest CD, Optical Society of America, Paper PD30, 2004, 4 Pages, ISBN 978-1-55752-772-1, XP031988743.

Moller L., et al., "Maximum-Likelihood Optimal-Sampling-Phase Estimation for Ultra-High-Sensitivity Optically Preamplified Duobinary Receivers," Journal of Lightwave Technology, Jan. 2005, vol. 23, No. 1, pp. 159-164, DOI:10.1109/JLT.2004.840360, ISSN 0733-8724, XP001227318.

Winzer P.J., et al., "Receivers for Advanced Optical Modulation Formats," The 16th Annual Meeting of the IEEE Lasers and Electro-Optics Society, LEOS, 2003, vol. 2, pp. 759-760, DOI: 10.1109/LEOS.2003. 1253021, ISBN 978-0-7803-7888-9, XP010674742.

Yin X., et al., "Performance Evaluation of Single Carrier 40-Gbit/s Downstream for Long-Reach Passive Optical Networks," International Conference on Optical Network Design and Modeling, May 19-22, 2014, pp. 162-167, XP032620059.

International Preliminary Report on Patentability for International Application No. PCT/US2020/027367, mailed Oct. 21, 2021, 14 Pages.

Office Action for Chinese Application No. 202080039703.9, dated May 1, 2024, 21 Pages.

* cited by examiner

ELECTRICAL DUOBINARY SOFT INFORMATION RECEIVER FOR NRZ MODULATION FIBER TRANSMISSION

REFERENCE TO RELATED APPLICATIONS

This application is a divisional of U.S. patent application Ser. No. 17/594,357 filed Oct. 12, 2021, entitled "ELECTRICAL DUOBINARY SOFT INFORMATION RECEIVER FOR NRZ MODULATION FIBER TRANSMISSION" which is a 371 national of PCT/US2020/027367 filed Apr. 9, 2020, entitled "ELECTRICAL DUOBINARY SOFT INFORMATION RECEIVER FOR NRZ MODULATION FIBER TRANSMISSION" which claims the benefit of U.S. Provisional Application No. 62/833,108 filed Apr. 12, 2019, entitled "ELECTRICAL DUOBINARY SOFT INFORMATION RECEIVER FOR NRZ MODULATION FIBER TRANSMISSION", each of which are herein incorporated by reference in their entireties.

FIELD

The present disclosure is directed to a receiver circuit and a method associated with NRZ modulation transmission and other forms of data transmission over an optical fiber medium.

BACKGROUND

Passive optical networks (PONs), Ethernet PON (EPON), gigabit EPON (GEPON), 10G-EPON (XEPON), gigabit capable PON (GPON), next generation PON (NG-PON) and many other derivatives, generically referred to herein as "PON" or "XGPON" are a telecommunications technology used to provide connectivity over optical fiber to the end consumer. Data rates in passive optical networks (PON) are increasing, e.g., to 50 Gbit/s per wavelength. Low density parity check (LDPC) codes are introduced for improved error correction coding and LDPC codes can process soft inputs. Standard soft decision receivers derive the soft information from the signal amplitude, using analog-to-digital converters (ADCs). The disadvantages are increased power consumption due to the ADC and increased cost because of higher linearity requirements for the receiver, and the additional requirement for a gain control in the receiver to have the ADC operating in a useful range. Other prior arts use a digital receiver and do not provide soft information, which can reduce the decoder performance. ADCs can be problematic for PONs because low cost and low power consumption are important requirements for the application. As the ADC itself has a high-power consumption, which approximately doubles with each additional bit of resolution. Furthermore, a higher receiver linearity and thus, more expensive optical and analog electrical components are required to benefit from the ADC soft information. The higher the resolution, the higher the linearity requirements. Thus, there is a need to reduce cost of the receiver optical components while keeping power consumption and linearity requirements low.

DETAILED DESCRIPTION

Figure 1:
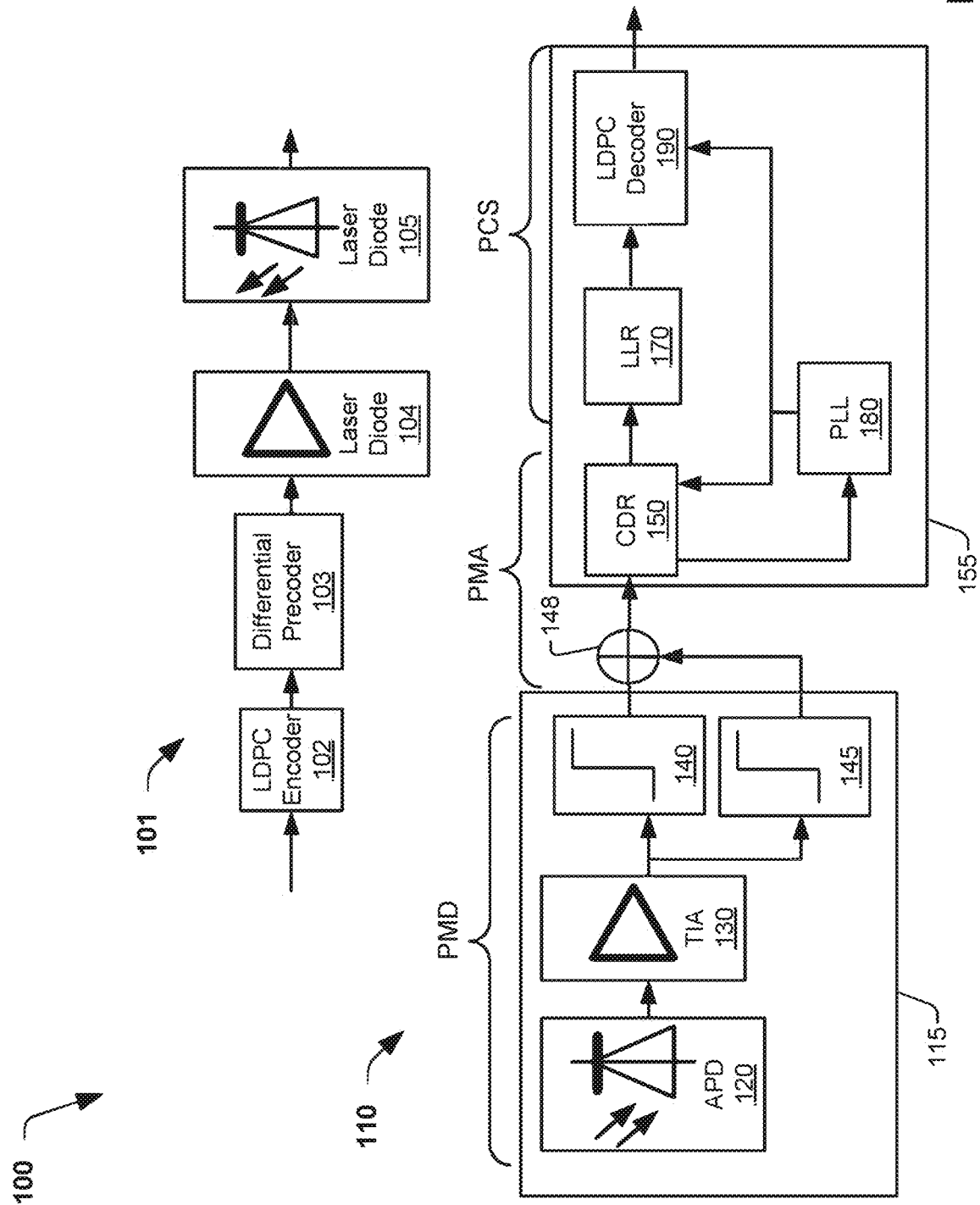
FIG. 1 is a block diagram illustrating an example user equipment (UE) in a passive optical network (PON) with a transmitter and an electrical duobinary (EDB) receiver useable in connection with various embodiments described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing circuitry or device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of the above described demands for improved error correction coding and LDPC codes to process soft inputs and to reduce cost of the receiver optical components, low bandwidth components can be used together with a differential precoding at the transmitter to perform an electrical duobinary modulation (EDB) at an EDB receiver. At the receiver, a demodulator using two thresholds (rather than one, as for non-return to zero (NRZ) modulation) can be configured to decode the signal. Alternatively, or additionally, analog-to-digital converters (ADC) are used in the receiver to provide amplitude information that is used to derive soft information for the LDPC decoder. The LDPC code used for error correction allows soft (non-binary) inputs to improve the decoder circuitry performance. Soft information receivers derive the soft information from the signal amplitude and thus, normally utilize ADCs. Thus, when using ADCs in passive optical networks (PONs), the resolution can be configured to be kept low, e.g., 2-3 bit, to keep power consumption and linearity requirements low.

With increasing data rates in the PON network, the limited receiver bandwidth can also be an issue to be addressed. One embodiment includes configuring an electrical duobinary receivers to enable decoding a signal with strong inter-symbol interference by the use of two receiver thresholds, rather than one.

This disclosure describes methods to derive soft information from the digital output of an electrical duobinary receiver. Through the limited receiver bandwidth, the soft information derived from the clock-data recovery (CDR) can increase effectiveness and efficiency. Additionally, or alternatively, low resolution ADCs can be configured for electrical duobinary receivers in embodiments herein. Additional aspects and details of the disclosure are further described below with reference to figures.

FIG. 1 illustrates an exemplary passive optical network (PON) 100 including a transmitter circuit 101 and a receiver circuit 110 with fiber and passive splitters in accordance with various embodiments herein.

The PON transmitter 101 comprises a forward error check encoder 102 (e.g., a low-density parity check (LDPC) encoder) coupled to a differential precoder 103 for electrical duobinary modulation. The differential precoder 103 is configured for performing the operation $$x\frac{t}{p} = x\frac{t-1}{p} \oplus x^t$$

where xt/p is a pre-coded bit sequence at time instance t and $\oplus$ is a XOR operation. The precoded signal can be amplified by the laser driver 104 and a laser diode 105 that converts the electrical signal into an optical signal for transmission over a fiber or optical medium.

Due to high attenuation of the PON network 100, an electric duobinary receiver 110 can have a high sensitivity as achieved by avalanche photo diode (APD) receivers 120, followed by a trans-impedance amplifier (TIA) 130 forming a part of receiver circuitry 115. The APD 120 is configured to receive an optical signal and converts the optical signal to an electrical signal to the TIA 130, where the electrical signal from the APD 120 is amplified.

The optical components of the receiver 110 used for PON 100 can be nonlinear to achieve the sensitivity required for receiving signals in a passive splitter network architecture. The receiver 110 can be implemented as a non-return to zero (NRZ) receiver or a binary receiver for 50 Gbit/s transmission. The receiver circuitry 115 can comprise a limiting amplifier, or two limiting amplifiers 140 and 145 as an electrical duo-binary (EDB) receiver, following the TIA 130. The limiting amplifiers 140 and 145 can be coupled to an exclusive OR operator 148 to perform an exclusive OR operation with the binary signal outputs generated from the limiting amplifiers 140 and 145, respectively.

The APD 120, TIA 130 and limiting amplifiers 140 and 145 can form at least a part of the Physical Medium Dependent (PMD) architecture. The XOR operator device 148 and the clock-data recovery (CDR) 150 can form at least a part of the Physical Medium Attachment (PMD) architecture. The log-likelihood ratios (LLR) calculation component or LLR circuit 170 and the decoder circuitry 190 can form at least a part of the Physical Coding Sublayer (PBS) architecture.

With increasing data rates in the PON network 100, limited receiver bandwidth can be addressed. One embodiment is to use electrical duobinary receivers in this case, which allow to decode a signal with strong inter-symbol interference by the use of two receiver thresholds rather than one. The limiting amplifiers 140 and 145 can convert the electrical signal from an output of the TIA 130 based on an EDB format. Soft information can be further derived from a digital output of the receiver circuitry 115 via decoder circuitry 155 an electrical duobinary receiver. Through the limited receiver bandwidth, the soft information derived from the CDR 150 can be effective.

In response to the binary signals being generated from both limiting amplifiers 140 and 145, they are combined by an XOR-operation at the XOR operator 148. From the resulting binary signal, the bit clock and the transmitted bit sequence can be recovered in the CDR component 150, which derives the phase error between the local clock and the receive bit sequence to be used to update a control loop of the phase locked loop (PLL) clock 180.

The LLR circuit 170 provides soft information for soft decision forward error corrections (FECs) from one or more binary receivers or low-resolution analog-to-digital converters in combination with an electrical duobinary receiver, which is configured to use lower bandwidth optical components, compared to a conventional NRZ receiver.

For a binary receiver, soft information can be derived from the clock-data recovery circuit 150, using an oversampled binary signal. This is the point in time where samples between the bit positions can be taken and selected to improve the mutual information and thus, the performance of the soft decision FEC decoder (e.g., an LDPC decoder) circuitry 190, for example. Soft information can be derived terms of log-likelihood ratios (LLR) and derived from the equalized receive signal amplitudes by the LLR circuit 170. Then, these outputs can be further processed by the error correction circuitry 190, for example, as an LDPC code to recover the transmitted bit sequences.

Figure 2:
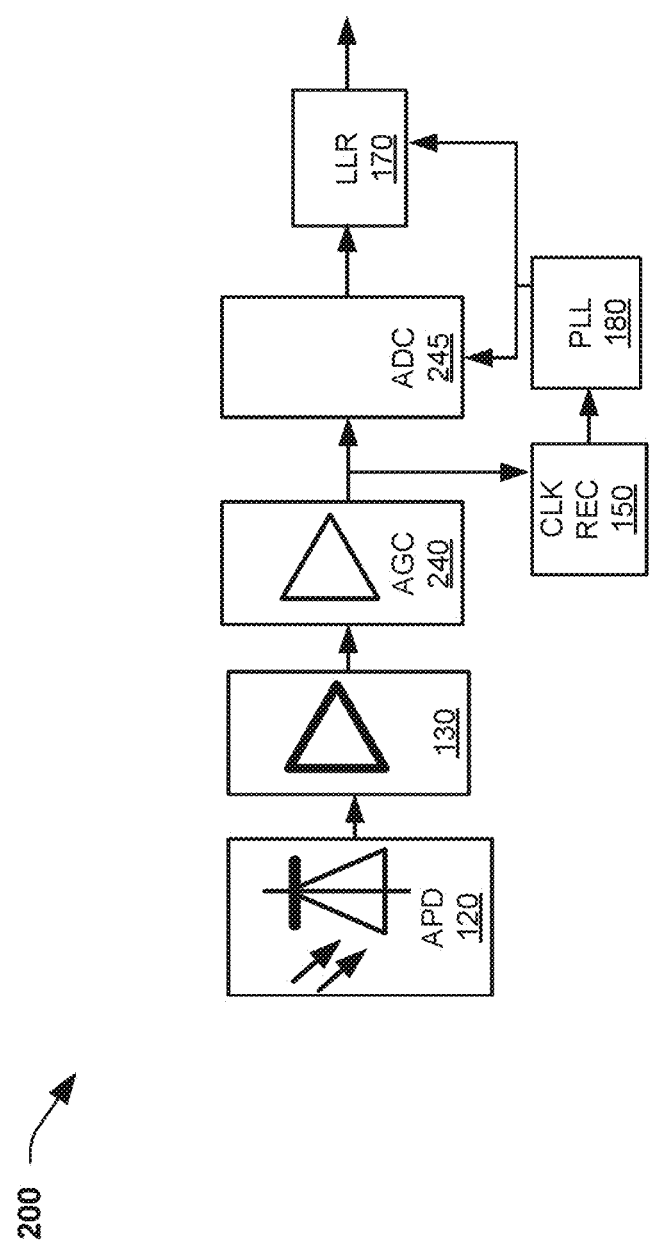
FIG. 2 is another block diagram illustrating an example UE in a PON with a transmitter and EDB receiver useable in connection with embodiments aspects described herein.

FIG. 2 illustrates an example of another embodiment of an EDB receiver 200 where the receiver circuitry can comprise an analog-to-digital converter (ADC). The receiver 200 illustrated in FIG. 2 comprises similar blocks as the receiver 100 of FIG. 1. For analog-to-digital-converter (ADC) based receivers, the electrical signal can be amplified by the automatic gain control (AGC) block 240 and converted to digital by the ADC 245. The ADC 245 can comprise a resolution of 2 or 3 bits, for example. With a low-resolution ADC 245 receiver being used, or with the receiver configuration 100 of FIG. 1 decision thresholds can be adjusted to optimize the mutual information, and thus, the performance of the soft decision by the decoder 190. This solution gives performance improvements when using binary receivers together with a soft decision FEC and one or more electrical duobinary receivers. The proposed solution with for ADC receivers can provide the same performance at a lower resolution and thus save cost as well as power through a simplified receiver design.

Figure 3:
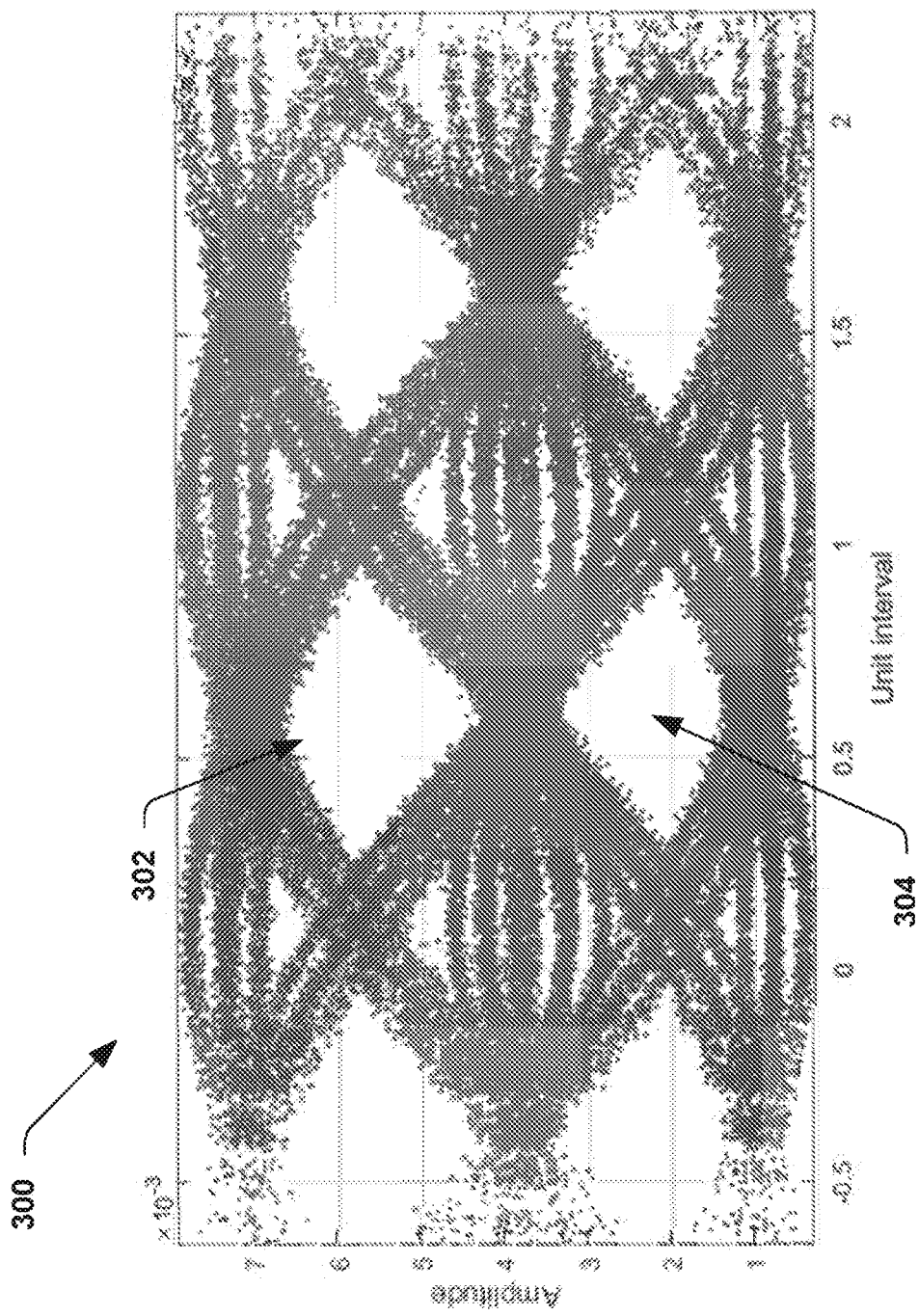
FIG. 3 is example diagram of an EDB receiver for determining probability density for probability bit locations based on one or more thresholds in connection with embodiments aspects described herein.

FIG. 3 illustrates an example of eye diagram of the EDB receivers in accord with various embodiments herein. The EDB receive signal 300 as illustrated in FIG. 3 has two eyes 302 and 304, and thus, two limiting amplifiers (e.g., 140 and 145) are employed, one for each eye. The binary signals of both limiting amplifiers (LAs) 140 and 145 are combined by an XOR-operation at XOR operator 148. From the resulting binary signal, the bit clock and the transmitted bit sequence can be recovered via the CDR block circuitry 150, which derives the phase error between the local clock and the receive bit sequence to be used to update the PLL clock control loop 180.

From the output of the CDR 150, the LLR calculation block provides the soft information in terms of log-likelihood ratios (LLR). For a receive signal y, the LLR 170 process the LLR as defined as $llry=\log(p_{xy}(x=0, y))$; (1)

Where $p_{xs}(x, y)$ is the conditional probability that y is received when x is transmitted. Based on the soft information, the FEC decoder 190 (e.g., an LDPC decoder) recovers the transmitted bit sequence.

In case of the receiver 200 with the ADC 245, as shown in FIG. 2, there is an analog-to-digital converter after the TIA 130. The bit clock is recovered from the AGC output signal of the AGC 240. From the ADC output, the soft information is calculated in the LLR circuit 170.

When using the receiver architecture shown in FIG. 1, a binary signal is available to derive the non-binary soft information via the XOR operator 148, the CDR circuit 150, and the LLR circuit 170. Soft information output via the LLR circuit 170 can be derived from multiple consecutive samples $y^t$ of the binary receive signals, which are available in the clock-data recovery (CDR) circuit 150.

Figure 4:
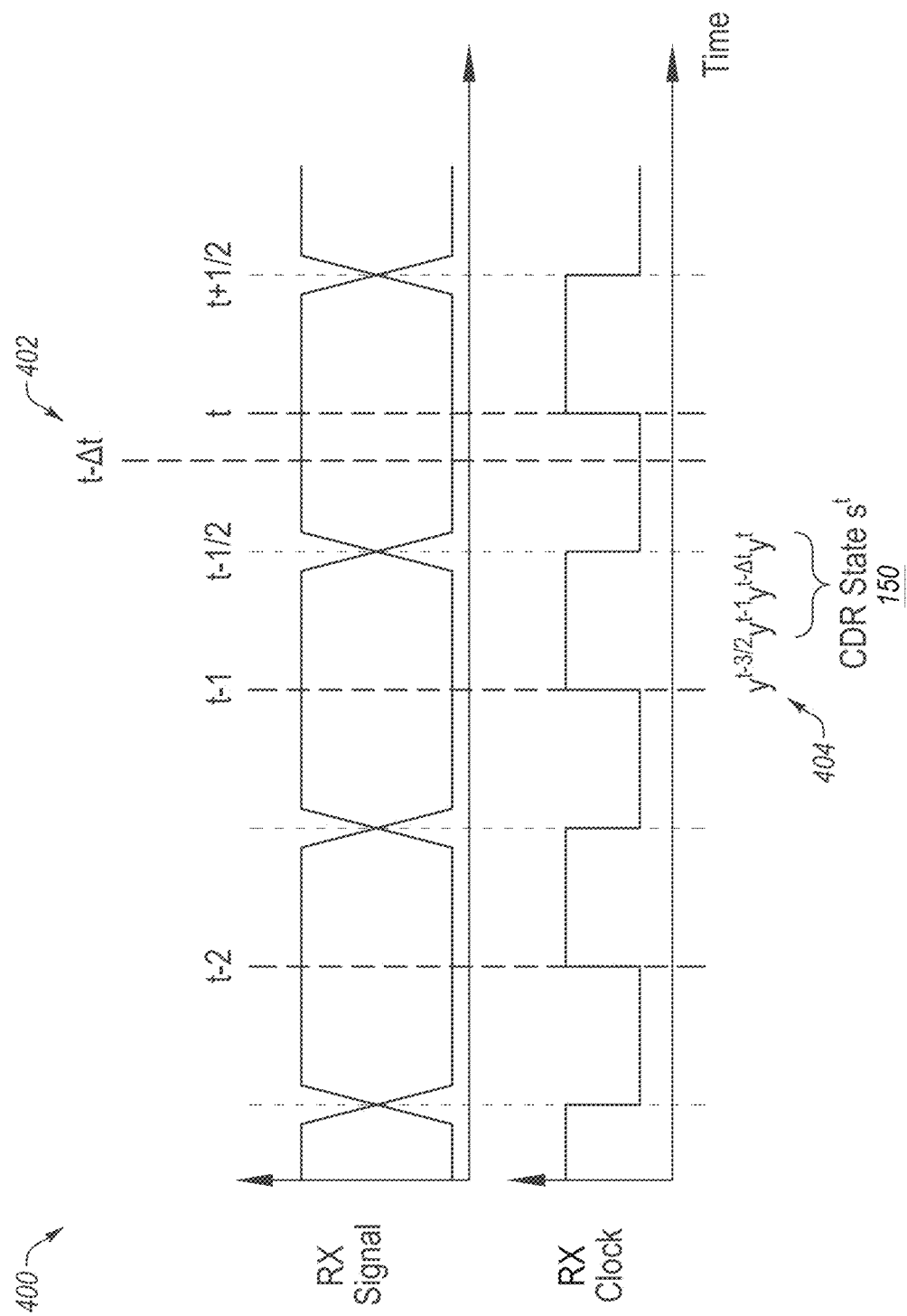
FIG. 4 is an example receiver signal and clock of soft information from a binary receiver in connection with embodiments aspects described herein.
Figure 6:
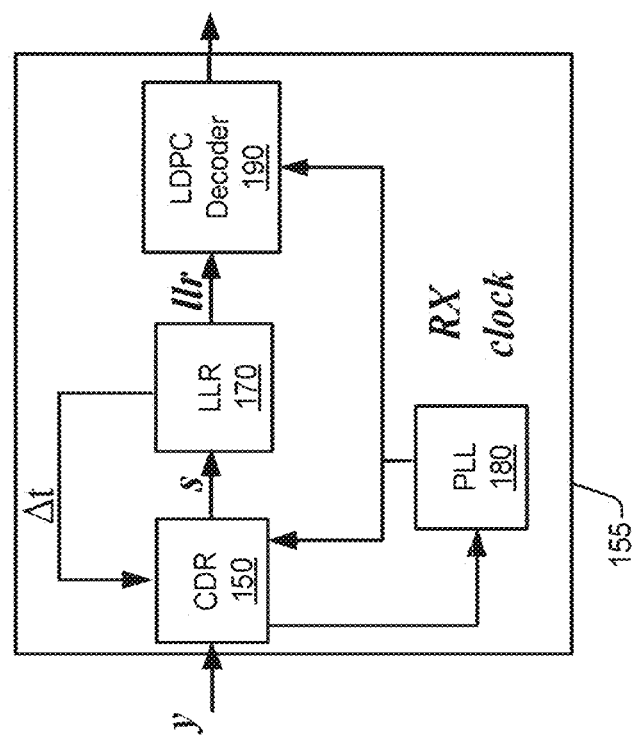
FIG. 6 is an example configuration of an CDR soft information adjustment in connection with embodiments aspects described herein.

FIG. 4 illustrates soft information from a binary receiver in accord with various embodiments. The CDR is configured to take samples at the bit position(s) t, e.g., $y^{t-1}, y^t$ as well as intermediate samples 404 (e.g., $y^{t-1/2}$) between the bit position(s) to derive the phase error for clock recovery with the PLL 180. For the soft information, used by the LDPC decoder 190, another/intermediate position 402 in time $t-\Delta t$ can give more information on the receive signal. As illustrated in FIG. 6 discussed briefly with FIG. 4, the example decoder circuitry 155 is configured to derive the soft information, the CDR states is associated to T consecutive samples, which gives $s \in 0, \ldots, 2^T-1$ possible values. For example, the values $s=[y^{t-1}, y^{t-\Delta t}y^t]$. Finding the optimal sample point $\Delta t$ can be a one-dimensional search that can be done in the receiver CDR.

Figure 5:
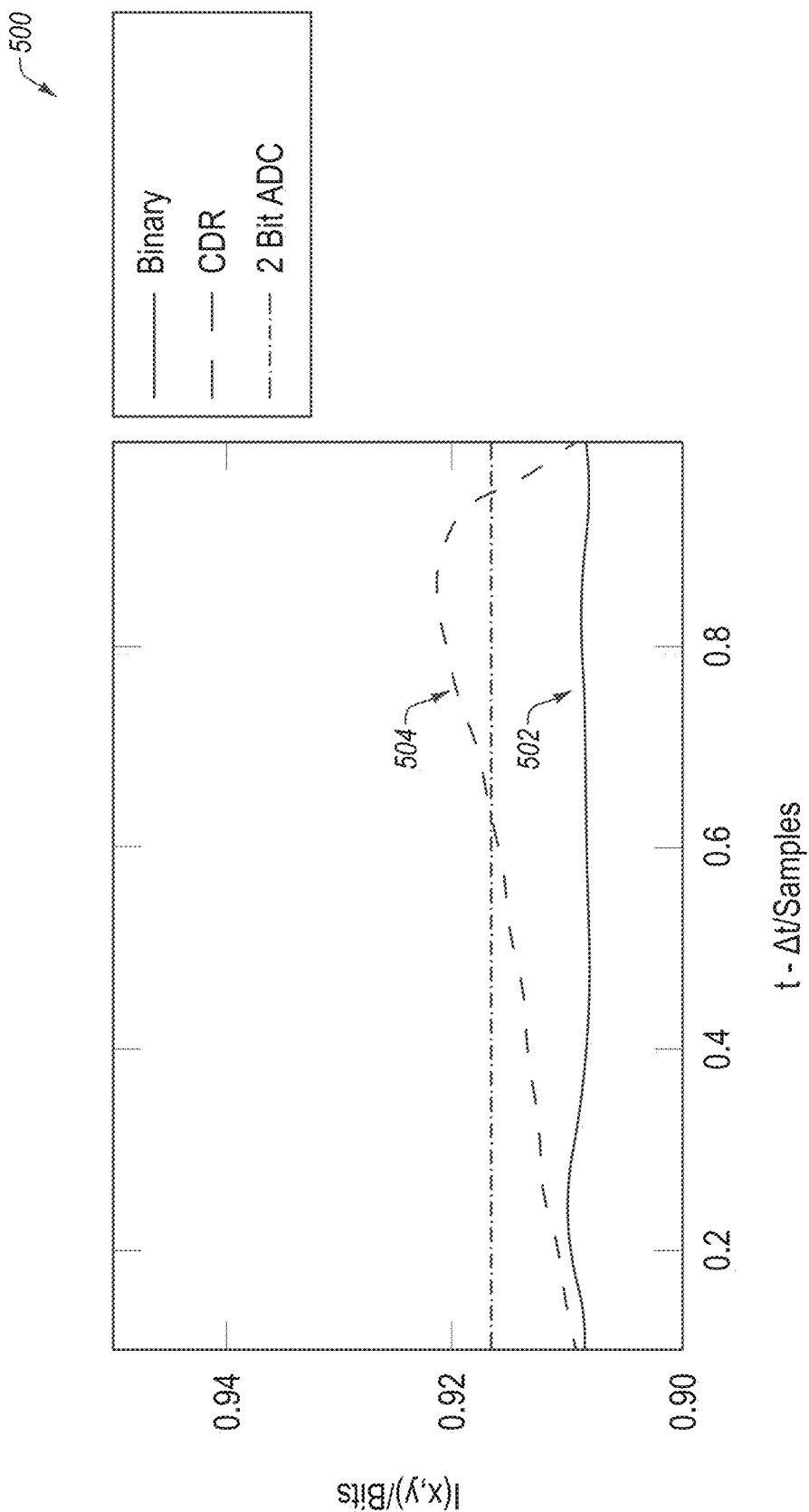
FIG. 5 is an example of mutual information for a two or three-bit CDR for an EDB receiver in connection with embodiments aspects described herein.

FIG. 5 illustrates mutual information 500 for 3-bit CDR for a 50G EDB (e.g., 50 Gbit/s transmission by the EDB receiver 100 or 200) in accord with embodiments. The resulting curves 500 are for possible values of $\Delta t$ between two-bit positions of zero and one, showing that for the input bit error rate around $10^{-2}$, the sample point of $\Delta t=0.15$ gives the highest theoretical capacity. For example, the CDR curve 504 reaches maximum at $t-\Delta t=0.85$ based on the binary output 502 deriving the soft information with a two-bit resolution.

Referring to FIG. 6, illustrated is the CDR soft information adjustment with intermediate values in accord with embodiments herein. To implement the optimized CDR soft information, an adjustment of the sample point of intermediate samples used to derive the soft information is employed in one embodiment. In the LLR block 170, the input signal ll for the FEC decoder is created from the CDR state s. The LLR values are defined as: $llr_s=\log(p_{xs}(x=0, s))-\log(p_{xs}(x=1, s))$; (2) where the conditional probabilities $p_{xs}(x, s)$ for state to be received when x=0 or x=1 are transmitted, are derived from counting the probabilities on a known sequence in the transmit signal. With knowledge of the probabilities $p_{xs}(x, s)$, the mutual information of the signal $I_{xs}(x, s)$ can be calculated as follows:

$$I(x, s) = \sum_{x \in 0,1} \sum_{s \in 0, \ldots 2^T-1} p_{xs}(x, s) \log_2\left(\frac{p_{xs}(x, s)}{p_x(x)p_s(s)}\right); \quad (3)$$

and the sample point $\Delta t$ is moved to the position of maximum mutual information. Once identified, this additional sample point timing is used to collect the additional sample in the CDR circuit.

When using analog-to-digital conversion in the receiver 200, as shown in FIG. 2 the resolution of the ADC 245 (e.g., 2 to 3 bits) can be an important design parameter. As a rule of thumb, each additional bit of resolution can double the power consumption, which is very critical at the sampling rates required for PON. The decision thresholds of the ADC 245 are usually at equal distance and the distance between those is selected sufficiently small. But for a low-resolution ADC 245, where the soft information is derived from the ADC output, directly, the ADC 245 can be configured with multiple decision thresholds at unequal distance, where it can be an advantage to have the decision thresholds at unequal distance(s).

Figure 7:
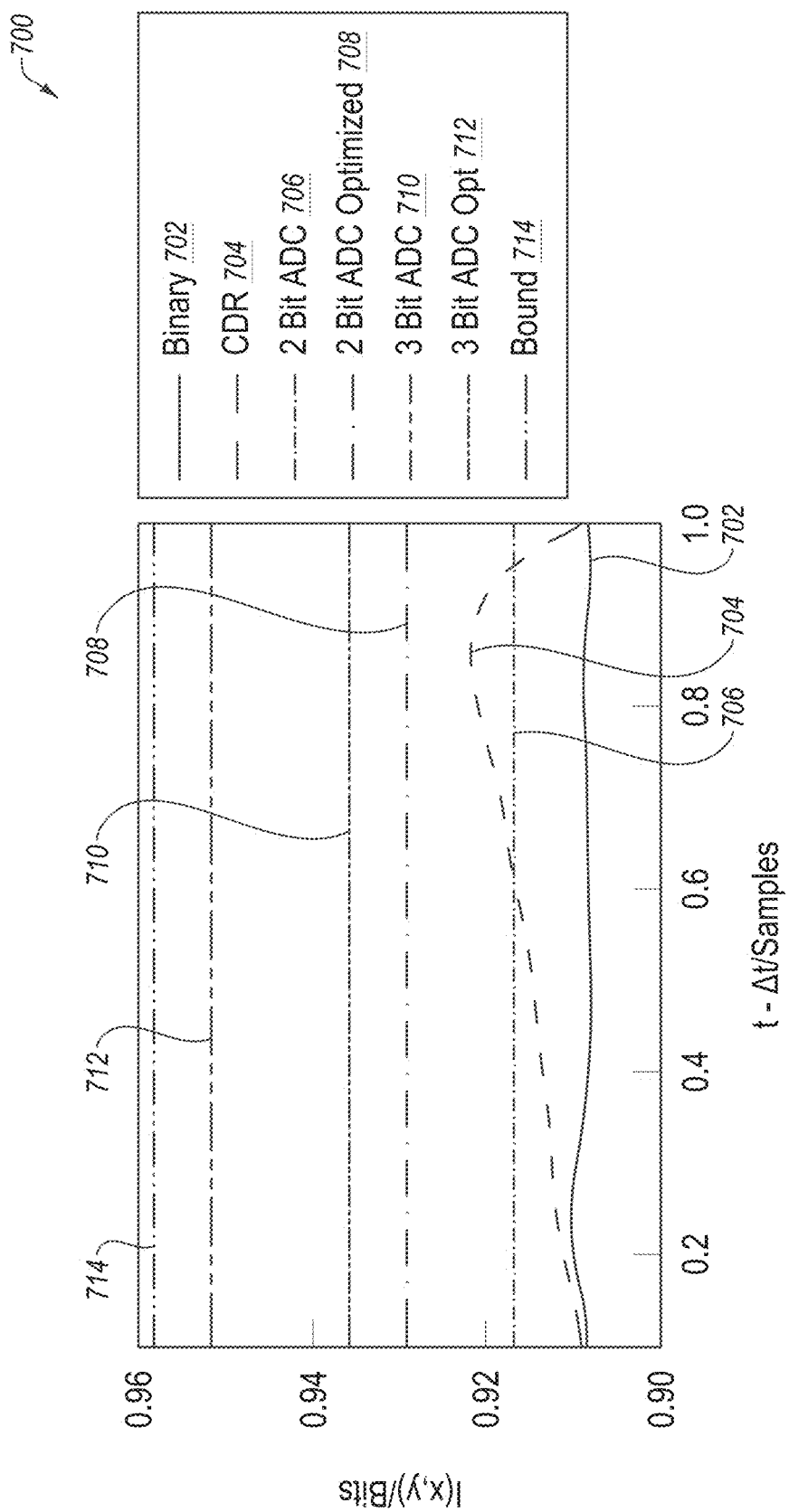
FIG. 7 is an example of mutual information for a two or three-bit CDR for an EDB receiver in connection with embodiments aspects described herein.

FIG. 7 illustrates mutual information 700 for 3-bit CDR and ADC soft information receiver for a 50G EDB receiver (e.g., 50 Gbit/s transmission by the EDB receiver) in accord with embodiments. The curves 700 demonstrate that for a 50 Gbits sample it can be difficult to utilize ADCs with a lot of bits (e.g., six, seven, eight bits), as they consume a lot of power and very expensive devices. Thus, the focus on the embodiments herein can be is on just few amplitude levels, like only two or three bits, or at least more than one bit, as the resolution of the ADC 215 as the least amount to configure for sampling. As illustrated, with just a two- or three-bit ADC a configuration can be implemented where the intermediate area can be adjusted by a position threshold between each of four or eight levels. The curves 700 illustrate transmission information where curves 702 for the binary signal (y) and 704 for the CDR soft information can be optimal and correspond to those curves 500 of FIG. 5. Curve 706 demonstrates a curve for a two-bit ADC and curve 708 the curve optimized with intermediate samples. Likewise, curve 710 demonstrates a curve for a three-bit ADC and curve 712 the same curve optimized. Curve 714 demonstrates a bound threshold.

Figure 8:
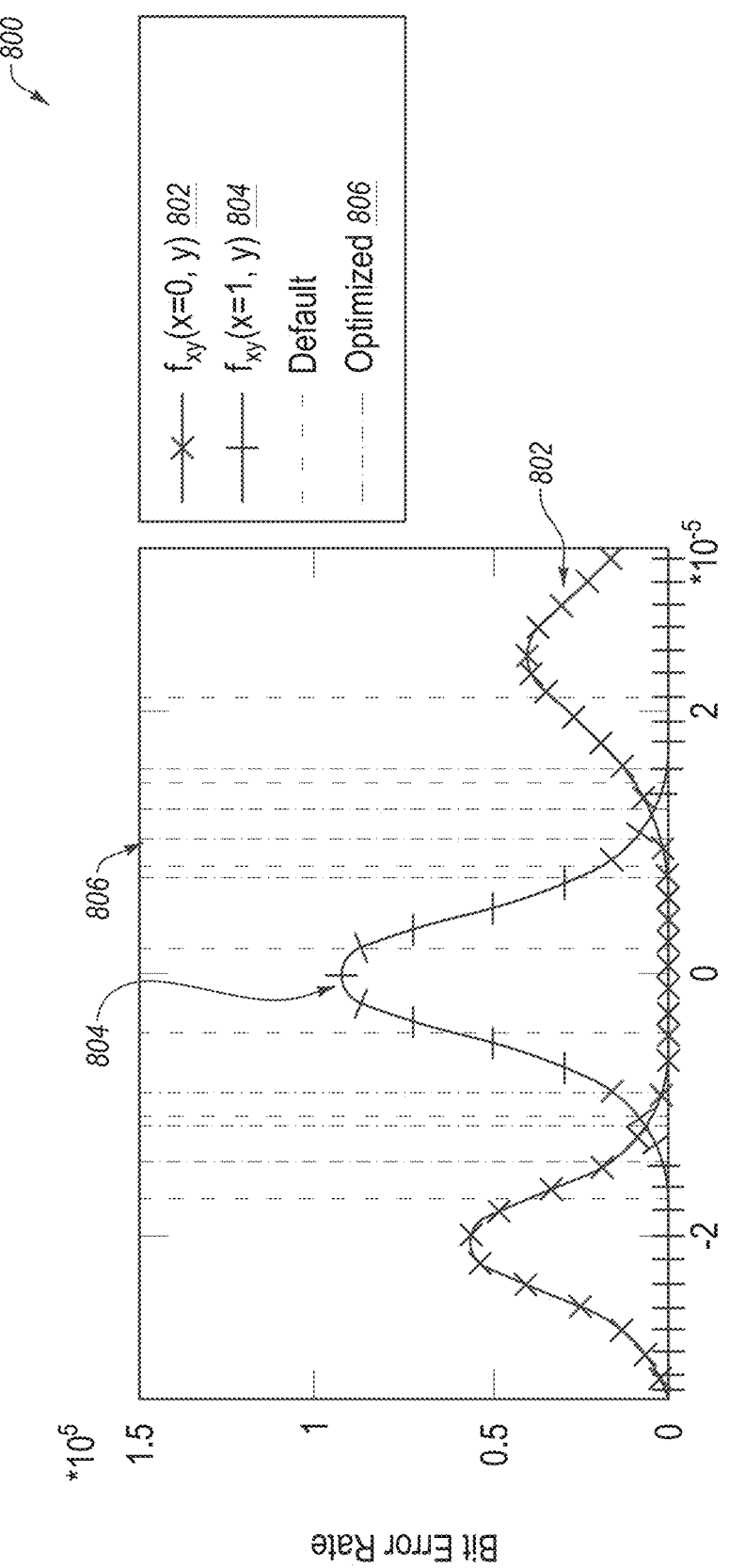
FIG. 8 is an example of threshold optimization for an EDB receiver in connection with embodiments aspects described herein.

The resulting curves 700 of threshold optimization for EDB as shown in FIG. 8 in an ADC threshold optimization for 3-bit ADC on EDB signal. The curves 800 demonstrate that it is much more efficient to have the decision thresholds around the two transition regions between a probability density for zero transmitted and for one transmitted, rather than uniformly distributed thresholds. Here, the intermediate thresholds 806 can be demonstrated and optimized based on the delta t variable as an offset for intermediate sample positions. The default thresholds can be seen by dotted vertical lines at a negative and positive region. The curve for a one region is 802 while the curve for zero at 804. In general with the ADC 245 more information can be obtained from the bit transmitted as with a two bit ADC where the distances between the amplitude positions can be equal to the threshold line and optimized with more samples so the threshold is the best up to this 0.9, which can be similar to a three bit eight level ADC as well.

As such, the curves 800 provide an example of how the optimal thresholds look like, in which otherwise the thresholds would be equally spaced as with the dotted lines not number and is what the ADC does when it has equal spacing (e.g., at minus three, minus one, and three plus one and like associated levels). If an optimization is performed to give the best possible levels are, it turns out that that there could be more thresholds in this transition region where the eye is open 302, 304 of FIG. 3 and no thresholds in the regions where it is closed and more difficult to ascertain, for example. The optimal sample points thus become closer together in the middle of the open eye 302 and 304 areas with division/divided thresholds. These are relevant points where the steps between the levels of the ADC would be, other than equally space it would go into the both eyes and with this intermediate sample threshold adjustment with delta t, for example, even with two or three bit ADCs can get a quite good quality of the soft information, without using more bits.

Other embodiments include how to obtain one or more sufficient thresholds by adjustment by utilizing a knowledge of the probability identity function so for a one and a zero transmitted, which are the curves 802, 804, where for 802 a zero transmitted and for 804 a one transmitted. With this information, a gradient step done in the end can give the optimal threshold position to place in the ADC.

In one embodiment, the optimal decision thresholds can be approximated by two ADCs with half resolution and uniformly distributed thresholds, with operation at two transition regions.

The information of the ADC sampled output signal can be given by:

$$l(x, y) = \sum_{x \in \mathbb{X}} \sum_{y \in \mathbb{Y}} p_{xy}(x, y) \log_2 \left( \frac{p_{xy}(x, y)}{p_x(x) p_y(y)} \right)$$

with the joint probability $p_{xy}(x, y)$ for x transmitted and y and the probability $p_x(x)$ for x being transmitted and $p_y(y) = p_{xy}(0, y) + p_{xy}(0, y)$ for y received. With knowledge of the probability density functions (PDF) $f_{xy}(x,y)$ and the corresponding cumulative density function (CDF) $F_{xy}(x, y)$ for receive amplitude y and transmitted bit x and $F_y(y) = F_{xy}(1, y)$, the optimal thresholds can be found by a gradient method.

Hereby, the thresholds are $y_{th,i}$ where, for a 3-bit ADC, there are 8 different levels and accordingly, there are 7 thresholds $y_{th,1}, \ldots y_{th,7}$.

The threshold update can be represented as follows:

$$y_{th,i}^{t+1} = y_{th,i}^t + \alpha \frac{\partial l(x, y)}{\partial y_{th,i}}$$

with step size $\alpha$ and the gradient is given by:

$$\alpha \frac{\partial l(x, y)}{\partial y_{th,i}} = \sum_{x \in 0,1} f_{xy}(x, y_{th,i}) \log \left( \frac{F_{xy}(x, y_{th,i-1}) - F_{xy}(x, y_{th,i})}{F_y(y_{th,i-1}) - F_y(y_{th,i})} \right) - f_{xy}(x, y_{th,i}) \log \left( \frac{F_{xy}(x, y_{th,i+1}) - F_{xy}(x, y_{th,i})}{F_y(y_{th,i+1}) - F_y(y_{th,i})} \right)$$

Hereby, $F_{xy}(x, y_{th,i}) = 0$ for i=0 and $F_{xy}(x, y_{th,i}) = 1$ for $i = 2^{adc\ bits}$. To PDF and the CDF of the receive signal amplitude $f_{xy}(x, y)$ and $F_{xy}(x, y)$ can be measured in a training phase, based on a known signal, using the ADC with an initial setting with uniformly distributed thresholds.

In one example of any one of embodiments herein a binary receiver for NRZ-modulated signals with a band limited (electrical duobinary) using two receiver decision thresholds, or standard NRZ receiver using one receiver decision threshold, where soft information for a soft information FEC decoder is provided from the clock-data recovery block, using multiple consecutive samples at the bit positions $y^t, y^{t-1}, y^{t-2}, \ldots$ as well as at positions between the bits $y^{t-\Delta t}, y^{t-1-\Delta t}, \ldots$. The sampling position of the intermediate samples t−Δt is controlled to improve the soft information. A receiver with analog-to-digital conversion for NRZ modulated signals with a band limited (electrical duobinary) receiver or a standard NRZ receiver can be utilized, where the ADC decision thresholds are adjusted to improve mutual information and thus, improve the efficiency of the following FEC decoder.

Figure 9:
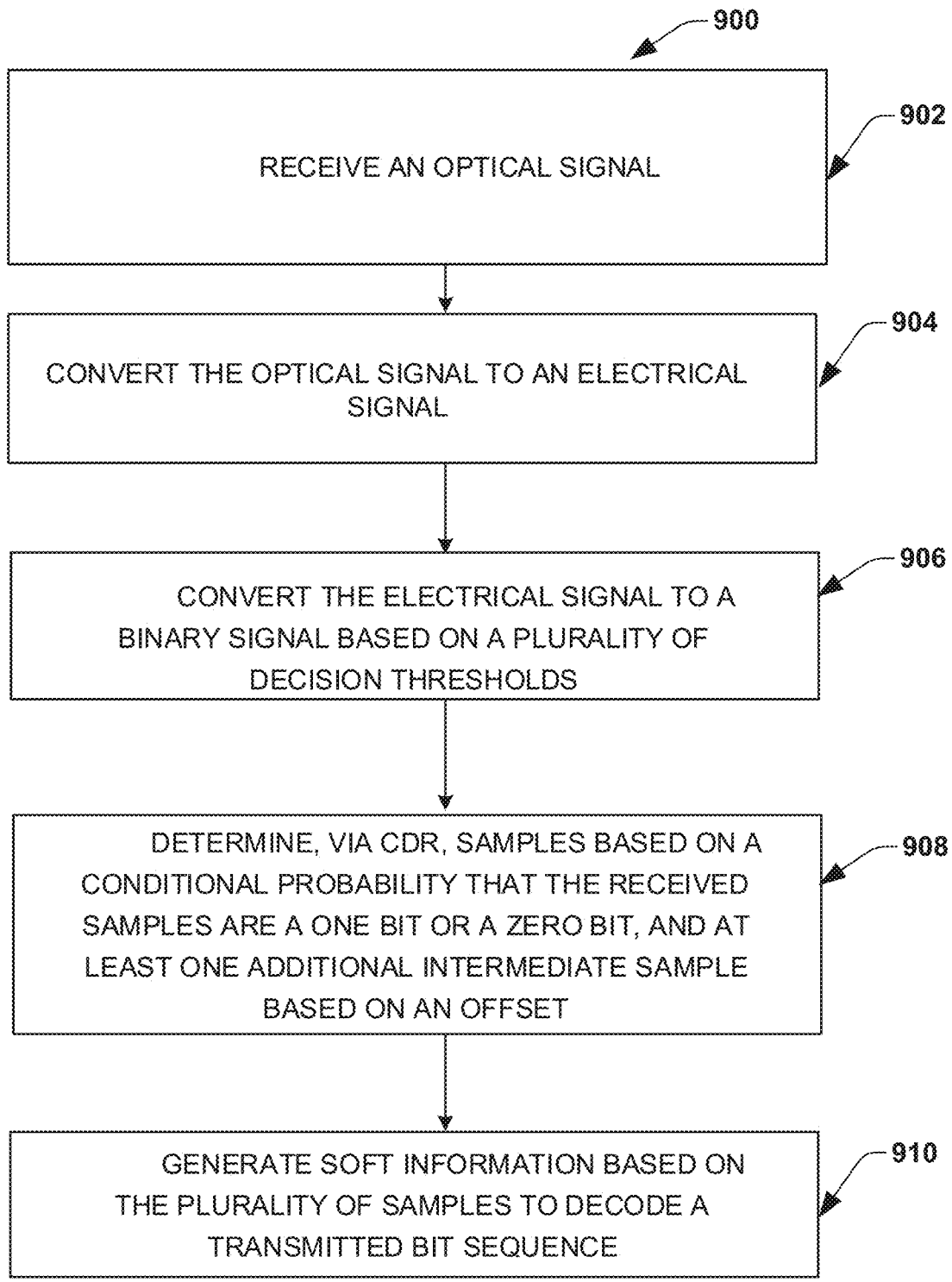
FIG. 9 is an example process flow for an EDB receiver in connection with embodiments aspects described herein.

Referring to FIG. 9 is an example process flow for an EDB receiver according to aspects here. The process flow 900 can initiate at 902 for an electrical duobinary receiver circuit receiving, via a photo diode, an optical signal. At 904, the process flow includes converting, via the photo diode, the optical signal to an electrical signal. At 906, the process flow includes converting the electrical signal to a binary signal based on a plurality of decision thresholds. At 908, the process flow includes determining, via a clock data recovery circuit, a plurality of samples based on a conditional probability that the received samples are a one bit or a zero bit, and at least one additional intermediate sample based on an offset. At 910, the process flow includes generating soft information based on the plurality of samples to decode a transmitted bit sequence.

In other embodiments, the process flow 900 can include outputting, via a first limiting amplifier, a first digital signal having a digital high value when the electrical signal exceeds a first decision threshold of the plurality of decision thresholds, and having a digital low value otherwise, as well as outputting, via a second limiting amplifier, a second digital signal having the digital high value when the electrical signal exceeds a second decision threshold of the plurality of decision threshold and having a digital low value otherwise. The first decision threshold and the second decision threshold can be different and unequally spaced from one another. The samples can be generated as consecutive samples. The offset can be selected as an optimal sample offset to determine the at least one intermediate sample. A probability of a bit position can be determined based on the consecutive samples and the at least one intermediate samples, wherein a number of bit positions comprises two or three. The plurality of decision thresholds can be determined based on a gradient.

Figure 10:
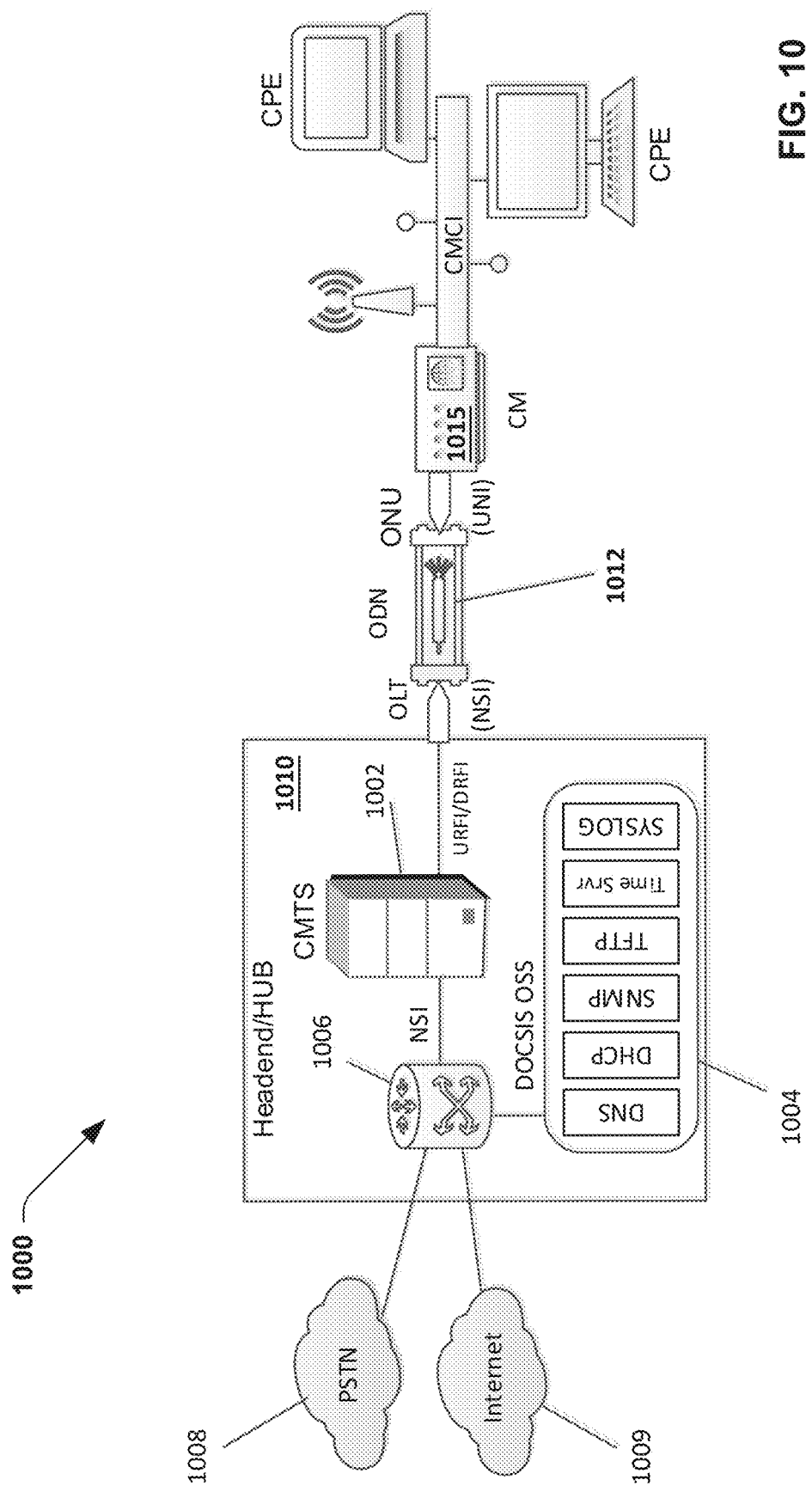
FIG. 10 illustrates an example network diagram for one or more embodiments of the disclosure.

According to certain embodiments, referring to FIG. 10, a telecommunications network 1000 is shown which provides broadband Internet access and/or other forms of packet-based communications network access, to subscribers via a point-to-multipoint passive optical network (PON). In an example embodiment, network 1000 may be a data over cable service interface specification (DOCSIS) cable network providing subscriber access to Internet 1009 and, if desired, other service access, such as public switched telephone network 1008, using a cable modem termination system (CMTS) 1002 and subscriber DOCSIS cable modems 1015 (only 1 is shown for simplicity) over a 10 Gb passive optical network (XGPON) 1012. XGPON, by virtue of being a passive optical network, will include and optical line terminal (OLT), and optical distribution network (ODN) and a plurality of optical network units (ONUs) although in FIG. 10 only a single end point is shown.

In this example, a network provider HUB or headend 1010 including the DOCSIS Cable Modem Termination System (CMTS) 1002 is communicatively coupled to IP network 1009 and PSTN 1008, via router or switch 1006, at its network service interface (NSI) and communicatively coupled to XGPON 1012 at the CMTS upstream/downstream RF interface.

Headend 1010 may include the relevant server(s), or port access to server(s) providing the operations support system (OSS) interfaces 1004 supporting CMTS 1002. Operations Support Systems Interfaces 1004 are the network element management layer interfaces between the network elements and the high-level OSSs which support the basic business processes required for CMTS operation. For example, OSS DNS, DHCP, SMTP, system logging, timing server and TFTP.

As shown in network 1000, embodiments of the present invention propose a combination of an XGPON system with a DOCSIS system in a design to enable highest reuse of existing equipment and software from both sides, as compared to DPoE in previous EPONs. In the various embodiments of the present invention, the DOCSIS CMTS 1002 may efficiently provide a plurality of cable modem (CM) 1015 subscribers fast and high bandwidth Internet over the ODN of XGPON 1012, by signaling the XGPON to alter its control to use DOCSIS as the management layer of XGPON 1012, either exclusively for DOCSIS modems 1015 or coexisting with other XGPON standard(s) managing different optical network units (ONUs) supporting other end user applications, enables a much less burdensome deployment of new PONs.

By way of one example embodiment, a DOCSIS compliant cable network transceiver, e.g., DOCSIS CMTS 1002, or possibly CM 1015, signals a corresponding connected transceiver e.g., the OLT or one of the ONUs, in the XGPON 1012, in a manner that the DOCSIS cable network takes control of the optical network upper management level processes, leaving XGPON in control of PHY layer protocols. In certain embodiments, other than initialization procedures, the XGPON is limited to layer 1 protocols including the physical medium dependent sublayer (PMD) and the transmission convergence (TC) sublayers. DOCSIS controls layer 2 and higher protocols, i.e., from lower data link layer 2-media access control (MAC) sublayer and higher, DOCSIS will manage IP data flows through the optical network above the boundaries of the XGPON TC layer. In this fashion, a simple division between the DOCSIS MAC layer and the XGPON PHY layers will manage data flows through the XGPON, rather than trying to split management tasks between both standards protocols as previously attempted with DPOE DOCSIS/EPON management attempts.

Figure 11:
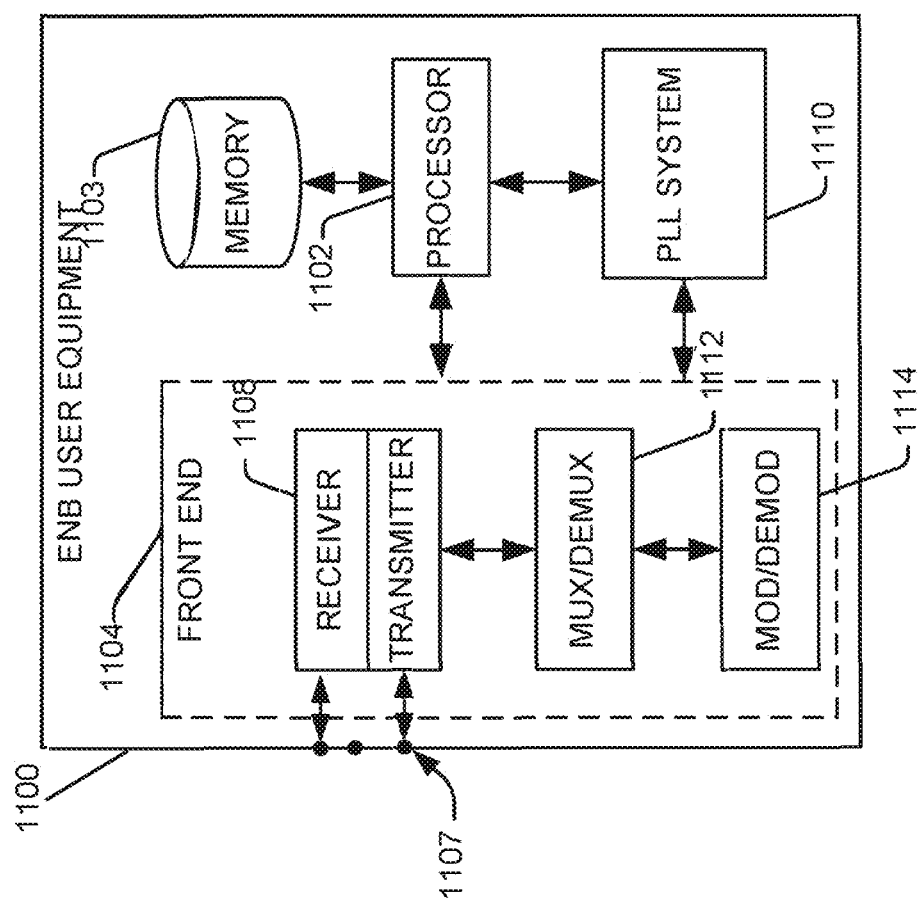
FIG. 11 illustrates an example device, according to the various aspects of the disclosure.

To provide further context for various aspects of the disclosed subject matter, FIG. 11 illustrates a block diagram of an embodiment of device 1100 (e.g., cable modem or gateway, etc.) related to access of a network (e.g., base station, wireless access point, femtocell access point, and so forth) that can enable and/or exploit features or aspects of the disclosed aspects.

The device 1100 can be utilized with one or more aspects (e.g., the core component, the PON component or the network components in here) of passive optical networks described herein according to various aspects. The EDB user device 1100, for example, comprises a digital baseband processor 1102 that can be coupled to a data store or memory 1103 and a front end 1104 (e.g., an RF front end, an acoustic front end, or the other like front end). The device 1100 further comprises one or more input/output ports 1107 configured to receive and transmit signals to and from one or more devices such as access points, access terminals, wireless ports, routers and so forth, which can operate within a radio access network or other communication network generated via a network device (not shown).

The device 1100 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 1104 can include a communication platform, which comprises electronic components and associated circuitry that provide for processing, manipulation or shaping of the received or transmitted signals via one or more receivers or transmitters (e.g. transceivers) 1108, a mux/demux component 1112, and a mod/demod component 1114. The front end 1104 is coupled to the digital baseband processor 1102 and the set of input/output ports 1107. The front end 1104 may be configured to perform the remodulation techniques described herein to extend the frequency range of the device 1100. In one aspect, the user equipment device 1100 can comprise a phase locked loop system 1110.

The processor 110 can confer functionality, at least in part, to substantially any electronic component within the mobile communication device 1100, in accordance with aspects of the disclosure. As an example, the processor 1102 can be configured to execute, at least in part, executable instructions that cause the front end to remodulate signals to selected frequencies. The processor 1102 is functionally and/or communicatively coupled (e.g., through a memory bus) to memory 1103 in order to store or retrieve information necessary to operate and confer functionality, at least in part, to communication platform or front end 1104, the phase locked loop system 1110 and substantially any other operational aspects of the phase locked loop system 1110. The phase locked loop system 1110 includes at least one oscillator (e.g., a VCO, DCO or the like) that can be calibrated via core voltage, a coarse tuning value, signal, word or selection process.

The processor 1102 can operate to enable the mobile communication device 1100 to process data (e.g., symbols, bits, or chips) for multiplexing/demultiplexing with the mux/demux component 1112, or modulation/demodulation via the mod/demod component 1114, such as implementing direct and inverse fast Fourier transforms, selection of modulation rates, selection of data packet formats, inter-packet times, etc. Memory 1103 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

In First Set of Examples

An Example 1 is a receiver circuit configured to receive an optical signal comprises a front end receiving circuit configured to receive the optical signal, and convert the optical signal from a duobinary signal format into a binary signal. The receiver circuit also comprises a clock data recovery circuit configured to receive the binary signal, and sample the binary signal per data period at a first time instant based on a predetermined clock data recovery technique, and sample the binary signal per data period at a second time instant offset from the first instant.

In an Example 2, that depends upon Example 1, the receiver circuit further comprises a log-likelihood ratio circuit configured to receive the samples from the clock data recovery circuit and generate a soft information output signal in terms of log-likelihood ratios based on the samples.

In an Example 3, that depends upon Example 2, the receiver circuit further comprises a decoder circuit configured to receive the soft information output signal, and generate a bit sequence in response thereto.

In an Example 4, that depends upon Example 1, the front end receiving circuitry comprises a photo diode configured to receive the optical signal and output an electrical signal in response thereto.

In an Example 5, that depends upon Example 4, the electrical signal is in an analog signal format, and the front end receiving circuitry further comprises a first limiting amplifier having a first threshold and configured to receive the electrical signal, and output a first digital signal having a digital high value when the electrical signal exceeds the first threshold, and having a digital low value otherwise. The front end receiver circuitry further comprises a second limiting amplifier having a second, different threshold, and configured to receive the electrical signal, and output a second digital signal having the digital high value when the electrical signal exceeds the second threshold and having a digital low value otherwise.

In an Example 6, that depends upon Example 5, the front end receiving circuitry further comprises a logic circuit configured to receive the first digital signal and the second digital signal and output the binary signal based on a logical operation performed on the first and second digital signals.

In an Example 7 that depends upon Example 6, the logic circuit is configured to perform an exclusive-OR operation.

In an Example 8 a receiver circuit configured to receive an optical signal comprises a front end receiving circuit configured to receive the optical signal, and convert the optical signal into an analog electrical signal. The receiver circuit further comprises an analog-to-digital converter (ADC) configured to receive the analog electrical signal and convert the analog electrical signal into a digital signal, wherein the ADC comprises a plurality of decision thresholds used for determining a digital level of the digital signal, and wherein the decision thresholds are unequally spaced from one another.

In an Example 9 that depends upon Example 8, the ADC comprises one or more thresholds at a location associated with a transmission region between a probability density for a zero transmission reaching a maximum and a probability density for a one transmission reaching a maximum.

In an Example 10 that depends upon Example 8, the receiver circuit further comprises a log-likelihood ratio circuit configured to receive the samples from the clock data recovery circuit and generate a soft information output signal in terms of log-likelihood ratios based on the samples.

In an Example 11 that depends upon Example 10, the receiver circuit further comprises a decoder circuit configured to receive the soft information output signal, and generate a bit sequence in response thereto.

In an Example 12 that depends upon Example 8, the front end receiving circuitry comprises a photo diode configured to receive the optical signal and output an electrical signal in response thereto.

In an Example 13 that depends upon Example 12, the receiver circuit further comprises an adjustable gain amplifier configured to receive the electrical signal and output an amplified electrical signal to the ADC.

In a Second Set of Examples

A first example is an apparatus of a passive optical network (PON) receiver configured to perform electrical duobinary demodulation in a PON network, comprising: an electrical duobinary receiver comprising a receiver circuit configured to receive an optical signal and convert the optical signal from an electrical duobinary signal format into a binary signal based on a plurality of decision thresholds, and a decoder circuit that is configured to receive the binary signal and sample the binary signal per data period based on an over-sampled binary signal and provide soft information derived from an output of a clock data recovery circuit.

A second example can include the first example, wherein the receiver circuit comprises a first limiting amplifier configured to generate a first binary signal from an electrical duobinary signal in the electrical duobinary format and a second limiting amplifier configured to generate a second binary signal based on the electrical duobinary signal in the electrical duobinary signal format.

A third example can include the first or second example, wherein the receiver circuit further comprises an exclusive-OR operator configured to receive the first binary signal and the second binary signal and output the binary signal to the decoder circuit based on an exclusive-OR operation.

A fourth example can include any one or more of the first through third examples, wherein the receiver circuit is configured to generate binary signals based on different amplitude thresholds as the plurality of decision thresholds of a first limiting amplifier and a second limiting amplifier.

A fifth example can include any one or more of the first through fourth examples, wherein the decoder circuit further comprising a log-likelihood ratio circuit configured to receive samples from the clock data recovery circuit and generate a soft information output signal in terms of log-likelihood ratios based on the samples at bit positions and at one or more intermediate positions between the bit positions based on an offset.

A sixth example can include any one or more of the first through fifth examples, wherein the decoder circuit comprises a forward error correction (FEC) decoder configured to receive the soft information output signal, and generate a bit sequence based on the soft information.

A seventh example can include any one or more of the first through sixth examples, wherein the decoder circuit is further configured to sample the one or more intermediate positions by modifying the offset to optimize the soft information output signal, and wherein the decision thresholds are unequally spaced from one another.

An eighth example can include any one or more of the first through seventh examples, wherein the receiver circuitry comprises a photo diode configured to convert the optical signal into an electrical signal and an analog-to-digital converter downstream comprising a bit resolution of two to three bits to provide amplitude information at an output, wherein the decision thresholds are unequally spaced from one another and the decoder circuit is configured to determine the soft information from the output of the analog-to-digital converter.

A ninth example can include any one or more of the first through eighth examples, wherein the over-sampled binary signal is derived from intermediate samples selected between samples at different bit positions, and the decoder circuit comprises an forward error correction (FEC) decoder to recover a transmitted bit sequence from the soft information that is based on the intermediate samples of the over-sampled binary signal and the samples at different bit positions.

A tenth example can be an electrical duobinary receiver circuit configured to receive an optical signal, comprising: a receive circuit configured to perform an electrical duobinary demodulation by processing the optical signal, and converting the optical signal into a binary signal based on a plurality of decision thresholds unequally spaced from one another; and a decoder circuity comprising a log-likelihood ratio circuit configured to process samples from a clock data recovery circuit, and generate a soft information output signal in terms of log-likelihood ratios based on the samples, wherein the samples are based on different bit positions and one or more intermediate positions between the bit positions based on an offset.

An eleventh example can include the tenth example, further comprising an analog-to-digital converter (ADC) configured to receive an analog electrical signal derived from the optical signal and convert the analog electrical signal into the binary signal, and wherein the samples are based on a threshold of the plurality of decisions being at a location associated with a transmission region between a probability density for a zero transmission satisfying a first threshold and a probability density for a one transmission satisfying a second threshold.

A twelfth example can include the eleventh example, wherein the receiver circuitry comprises a photo diode configured to convert the optical signal into an electrical signal, and a plurality of limiting amplifiers configured to convert the electrical signal into binary signals to an output for an exclusive OR operation, wherein a first limiting amplifier of the plurality of amplifiers comprises a first decision threshold and the second limiting amplifier of the plurality of amplifiers comprises a second decision threshold of the plurality of decision thresholds that is different from the first decision threshold.

A thirteenth example can include any one or more of the eleventh through the twelfth examples, wherein the log-likelihood ratio circuit is configured to receive samples from the clock data recovery circuit and generate a soft information output signal in terms of log-likelihood ratios based on a conditional probability that the received samples are a one bit or a zero bit, and at least one additional intermediate value based on the offset.

A fourteenth example can include any one or more of the eleventh through the thirteenth examples, wherein the clock data recovery circuit is configured to generate the samples as consecutive samples and select the offset as an optimal sample offset to determine one or more intermediate samples at the one or more intermediate positions between zero and one.

A fifteenth example can include any one or more of the eleventh through the fourteenth examples, further comprising an analog-to-digital converter comprising a bit resolution of two to three bits for the plurality of decision thresholds, wherein the plurality of decision thresholds are based on a gradient and updated based on a step size and the gradient in a training phase of the ADC.

A sixteenth example can be an method for an electrical duobinary receiver circuit comprising: receiving, via a photo diode, an optical signal; converting, via the photo diode, the optical signal to an electrical signal; converting the electrical signal to a binary signal based on a plurality of decision thresholds; determining, via a clock data recovery circuit, a plurality of samples based on a conditional probability that the received samples are a one bit or a zero bit, and at least one additional intermediate sample based on an offset; and generating soft information based on the plurality of samples to decode a transmitted bit sequence.

An sixteenth example can include the sixteenth example, further comprising: outputting, via a first limiting amplifier, a first digital signal having a digital high value when the electrical signal exceeds a first decision threshold of the plurality of decision thresholds, and having a digital low value otherwise; and outputting, via a second limiting amplifier, a second digital signal having the digital high value when the electrical signal exceeds a second decision threshold of the plurality of decision threshold and having a digital low value otherwise; wherein the first decision threshold and the second decision threshold are different and unequally spaced from one another.

An eighteenth example can include the sixteenth through seventeenth examples, further comprising: outputting the binary signal based on a logical operation performed on the first digital signal and the second digital signal.

A nineteenth example includes any one or more of the sixteenth through eighteenth examples, further comprising: generating the samples as consecutive samples; selecting the offset as an optimal sample offset to determine the at least one intermediate sample; and determining a probability of a bit position based on the consecutive samples and the at least one intermediate samples, wherein a number of bit positions comprises two or three.

A twentieth example includes any one or more of the seventeenth through nineteenth examples, further comprising: determining the plurality of decision thresholds based on a gradient.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An electrical duobinary receiver circuit configured to receive an optical signal, comprising:
   a receive circuit configured to perform an electrical duobinary demodulation by processing the optical signal, and converting the optical signal into a binary signal based on three or more decision thresholds with distances therebetween that are unequally spaced from one another; and
   a decoder circuitry comprising a log-likelihood ratio circuit configured to process samples from a clock data recovery circuit, and generate a soft information output signal in terms of log-likelihood ratios based on the samples, wherein the samples are based on different bit positions and one or more intermediate positions between the bit positions based on an offset.

2. The receiver circuit of claim 1, further comprising an analog-to-digital converter (ADC) configured to receive an analog electrical signal derived from the optical signal and convert the analog electrical signal into the binary signal, and wherein the samples are based on a threshold corresponding to one of the three or more decision thresholds being at a location associated with a transmission region between a probability density for a zero transmission satisfying a first threshold and a probability density for a one transmission satisfying a second threshold.

3. The receiver circuit of claim 1, further comprising:
a photo diode configured to convert the optical signal into an electrical signal, and
a plurality of limiting amplifiers configured to convert the electrical signal into binary signals to an output for an exclusive OR operation,
wherein a first limiting amplifier of the plurality of limiting amplifiers comprises a first decision threshold and a second limiting amplifier of the plurality of limiting amplifiers comprises a second decision threshold of the three or more decision thresholds that is different from the first decision threshold.

4. The receiver circuit of claim 1, wherein the log-likelihood ratio circuit is configured to receive the samples from the clock data recovery circuit and generate a soft information output signal in terms of log-likelihood ratios based on a conditional probability that the received samples are a one bit or a zero bit, and at least one additional intermediate value based on the offset.

5. The receiver circuit of claim 1, wherein the clock data recovery circuit is configured to generate the samples as consecutive samples and select the offset as an optimal sample offset to determine one or more intermediate samples at the one or more intermediate positions between zero and one.

6. The receiver circuit of claim 1, further comprising an analog-to-digital converter comprising a bit resolution of two to three bits for the three or more decision thresholds, wherein the three or more decision thresholds are based on a gradient and updated based on a step size and the gradient in a training phase of an analog-to-digital converter (ADC).

7. A method for an electrical duobinary receiver circuit, the method comprising:
receiving, via a photo diode, an optical signal;
converting, via the photo diode, the optical signal to an electrical signal;
converting the electrical signal to a binary signal based on a plurality of decision thresholds;
determining, via a clock data recovery circuit, a plurality of samples based on a conditional probability that the plurality of samples are a one bit or a zero bit, and at least one additional intermediate sample based on an offset; and
generating soft information based on the plurality of samples to decode a transmitted bit sequence.

8. The method of claim 7, further comprising:
outputting, via a first limiting amplifier, a first digital signal having a digital high value when the electrical signal exceeds a first decision threshold of the plurality of decision thresholds, and having a digital low value otherwise; and
outputting, via a second limiting amplifier, a second digital signal having the digital high value when the electrical signal exceeds a second decision threshold of the plurality of decision threshold and having a digital low value otherwise;
wherein the first decision threshold and the second decision threshold are different.

9. The method of claim 8, further comprising:
outputting the binary signal based on a logical operation performed on the first digital signal and the second digital signal.

10. The method of claim 7, further comprising:
generating the samples as consecutive samples;
selecting the offset as an optimal sample offset to determine the at least one additional intermediate sample; and
determining a probability of a bit position based on the consecutive samples and the at least one additional intermediate samples, wherein a number of bit positions comprises two or three.

11. The method of claim 7, further comprising:
determining the plurality of decision thresholds based on a gradient.

* * * * *